United States Patent
Just et al.

(10) Patent No.: US 6,443,517 B1
(45) Date of Patent: Sep. 3, 2002

(54) VEHICLE ROOF WITH AN ADJUSTABLE CONVERTIBLE TOP

(75) Inventors: Jan Just, Tübingen; Matthias Aydt, Eberdingen, both of (DE)

(73) Assignee: CTS Fahrzeug Dachsysteme GmbH, Korntal-Munchingen (DE)

( * ) Notice: Subject to any disclaimer, the term of this patent is extended or adjusted under 35 U.S.C. 154(b) by 0 days.

(21) Appl. No.: 09/710,882

(22) Filed: Nov. 14, 2000

(51) Int. Cl.⁷ .............................................. B62D 25/10
(52) U.S. Cl. ........................ 296/107.09; 296/107.01; 296/107.08; 296/107.16; 280/756
(58) Field of Search ..................... 296/107.01, 107.08, 296/107.09, 107.16, 76, 136; 280/756

(56) References Cited

U.S. PATENT DOCUMENTS

| | | | |
|---|---|---|---|
| 4,557,502 A | | 12/1985 | Scaduto et al. |
| 4,767,147 A | * | 8/1988 | Kobayakawa et al. ....... 296/1.1 |
| 5,211,718 A | * | 5/1993 | Götz et al. ................ 296/180.1 |
| 5,558,388 A | * | 9/1996 | Fürst et al. .................. 296/108 |
| 5,702,150 A | | 12/1997 | Reuter et al. |
| 5,918,928 A | | 7/1999 | Kolb et al. |
| 6,053,560 A | * | 4/2000 | Rothe .......................... 296/108 |
| 6,081,188 A | * | 6/2000 | Kutlucinar et al. ......... 340/438 |
| 6,217,104 B1 | * | 4/2001 | Neubrand .................... 296/108 |
| 6,267,432 B1 | * | 7/2001 | Stolle ..................... 296/107.01 |
| 6,293,605 B2 | * | 9/2001 | Neubrand ..................... 296/76 |

FOREIGN PATENT DOCUMENTS

| | | |
|---|---|---|
| DE | 195 33 974 A1 | 3/1997 |
| DE | 195 40 742 A1 | 5/1997 |
| DE | 44 12 109 | 6/1997 |
| DE | 196 43 225 | 5/1998 |
| DE | 196 46 035 | 5/1998 |
| EP | 0 362 524 | 4/1990 |

OTHER PUBLICATIONS

* cited by examiner

Primary Examiner—Joseph D. Pape
Assistant Examiner—G. Blankenship
(74) Attorney, Agent, or Firm—Crowell & Moring LLP

(57) ABSTRACT

A vehicle roof has a convertible top which can be adjusted between a closed position and an open position. The top spans the vehicle interior in the closed position and is deposited in a convertible top depositing device in the open position. Furthermore, a rollover bar is coupled with the convertible top depositing device. For a facilitated assembly and function testing, the rollover bar forms a cohesive, firmly connected unit with the convertible top depositing device and the convertible top. The unit can be integrated in the vehicle as a preassembled module.

17 Claims, 3 Drawing Sheets

VEHICLE ROOF WITH AN ADJUSTABLE CONVERTIBLE TOP

BACKGROUND OF THE INVENTION

The present invention relates to a vehicle roof having a convertible top which can be adjusted between a closed and an open position, and more particularly, to a vehicle roof convertible top deposited in a convertible top depositing device in the open position, and having a rollover bar which is coupled with the convertible top depositing device, the rollover bar forming a cohesive, firmly connected unit with the convertible top depositing device and the convertible top, which unit can be integrated as a preassembled module in the vehicle.

DE 197 14 104 C1 discloses a convertible vehicle which has an adjustable rollover bar. In the closed position of the convertible top, the rollover bar is in a folded-over deposited position, and in the opened position of the convertible top, it is in an erected protective position. During the transition movement of the convertible top from the closed to the open position, the convertible top is first moved into a rearward position behind the rollover bar and a convertible top compartment lid; then the convertible top compartment lid is opened; the convertible top is transferred into the storage space, and the convertible top compartment lid is finally closed again. The opening and closing movement of the convertible top compartment lid is triggered by the rollover bar which, for this purpose, can be coupled with the convertible top compartment lid. After the transfer of the convertible top into the storage position and after the closing of the convertible top compartment lid, the rollover bar is uncoupled from the convertible top compartment lid and is changed into its upright protective position.

The rollover bar has a vehicle-fixed swivelling axis, and also the kinematics of the convertible top are fixedly connected with the vehicle. The swivelling axes of the convertible top kinematics, viewed in the longitudinal direction of the vehicle, is arranged behind the rollover bar and the convertible top compartment lid. Thereby, during the transition between the open and the closed position, the convertible top is ensured to carry out a movement which reaches over the rollover bar and the convertible top compartment lid.

Viewed in the longitudinal direction of the vehicle, this construction requires a relatively large installation space, whereby the available space for the vehicle occupants and the trunk space is reduced correspondingly. Another problem is the fact that the vehicle roof, including the rollover bar, must be installed during the assembly of the vehicle individually for each vehicle and, after the installation, must be subjected to a functional test. Consequently, possibly occurring faults and malfunctioning result in high-expenditure touch-up work which hinder the entire production process of the vehicle.

DE 196 43 225 C1 describes an adjustable vehicle roof which can be used as a preassembled module in a vehicle. The module comprises a convertible top depositing device, a rollover bar and an adjustable convertible vehicle top. A rollover bar, which can be folded over, is also assigned to the vehicle roof module, is deposited horizontally in a normal case and is situated in a convertible top pan of the convertible top depositing device. In emergencies, the rollover bar is erected into a vertical position which protects the vehicle occupants.

The foldable rollover bar must be swivellably disposed on the pan of the convertible top depositing device. The components must be situated in the swivelling path of the rollover bar to hinder the swivelling movement. Also, the rollover bar must also not absorb any other forces impairing the swivelling movement so that a secure erecting of the rollover bar is ensured in emergencies. A linking of the vehicle roof module to the vehicle body by way of the swivellable rollover bar is therefore excluded. On the contrary, the linking must take place by way of a stationary component, specifically by the convertible top pan or a support assigned to the convertible top depositing device. However, viewed in the longitudinal direction of the vehicle, the convertible top depositing device is situated behind the overall center of gravity of the vehicle roof module, and therefore a support in only one plane in the area of the convertible top depositing device is not possible. On the contrary, additional linking points must be provided in a second plane which absorb a considerable portion of the weight and, because of the arrangement outside the center of gravity of the module, additionally absorb tilting moments. This increases the component stress in the area of the vehicle roof module as well as in the area of the absorbing vehicle body.

DE 44 12 109 A1 discloses a combination of the rollover bar and the convertible vehicle top and a preassembled unit. Diverse additional supports are provided on the rollover bar to permit a linking of the preassembled unit to the vehicle body. Viewed in the longitudinal direction of the vehicle, the supports of the rollover bar are spaced from one another. At least four connection points are provided between the vehicle roof module and the vehicle body and are situated in two different transverse planes, so that additional tilting moments must be absorbed.

With respect to the general technological background, reference is also made to DE 196 46 035 C2.

SUMMARY OF THE INVENTION

An object of the present invention is to provide a vehicle roof which, on one hand, meets high safety requirements and, on the other hand, can be manufactured and assembled at reasonable costs.

According to the present invention, this object has been achieved by providing a transverse frame on the rollover bar, which transverse frame is the support of the individual bars of the rollover bar and furthermore receives the components assigned to the convertible top receiving device, and in that connection points for connection of the module with the vehicle are provided in the transverse frame.

The rollover bar of the present invention forms a cohesive, firmly connected unit or module with the convertible top depositing device and the convertible top. This firmly connected unit, which particularly has an inherently rigid construction, can be prefabricated in an independent manufacturing and production process and, before the installation into the vehicle as an independent module, can be subjected to a complete function test. Touch-up work and the elimination of defects are carried out independently of the production process of the vehicle; the production sequences of the vehicle and the vehicle roof are largely spatially and temporarily uncoupled.

After the assembly and the function testing of the vehicle roof, this new type of vehicle roof can be inserted as a prefabricated unit into the vehicle and, particularly by way of the rollover bar, can be connected as a central constructional unit within the module with the vehicle.

The module also meets high safety requirements while its size is small. That is, as a result of the unit of the rollover bar as the central component, the convertible top depositing device as the component situated in the rear, and the convertible top as the component situated in the front in the closed position, a spatially compact arrangement can be achieved. The rollover bar which, in particular, is constructed as a stationary rollover bar, meets the safety requirements of an adjustable vehicle roof. Particularly in a construction in which the rollover bar is connected by connection points directly with the vehicle body, a direct power flux exists from the rollover bar into the vehicle body.

The convertible top depositing device, which advantageously comprises a convertible top pan for receiving the convertible top in the open position and a convertible top compartment lid, is expediently connected with the rollover bar by way of supporting arms. Thereby, the swivelling axis of the convertible top compartment lid is situated particularly on the side of the supporting arms facing away from the rollover bar so that, when the convertible top compartment lid is opened, the open side of the lid faces the rollover bar and the convertible top can be deposited without any impairment in the storage space.

In a currently preferred embodiment, the module additionally comprises one or several of the following constructional units: Hydraulic adjusting system for the convertible top as well as the control of the hydraulic adjusting system, adjusting kinematics for the convertible top compartment lid and central plug-type connection for the vehicle-side linking of the vehicle electric system and of the current supply of electrical adjusting elements. In this embodiment, the module comprises all components required for the operation so that, immediately after the assembly still before the installation into the vehicle, a function testing of the vehicle roof can be carried out without special devices. In addition, the installation into the vehicle is significantly facilitated because, besides the mechanical linking which can be established by way of a few connection points by simple devices, only a single electric plug-type connection must be closed.

BRIEF DESCRIPTION OF THE DRAWINGS

These and other features of the invention that will be apparent to those skilled in the art from the following detailed description of the invention, taken together with the accompanying drawings.

DETAILED DESCRIPTION OF THE DRAWINGS

Figure 1:
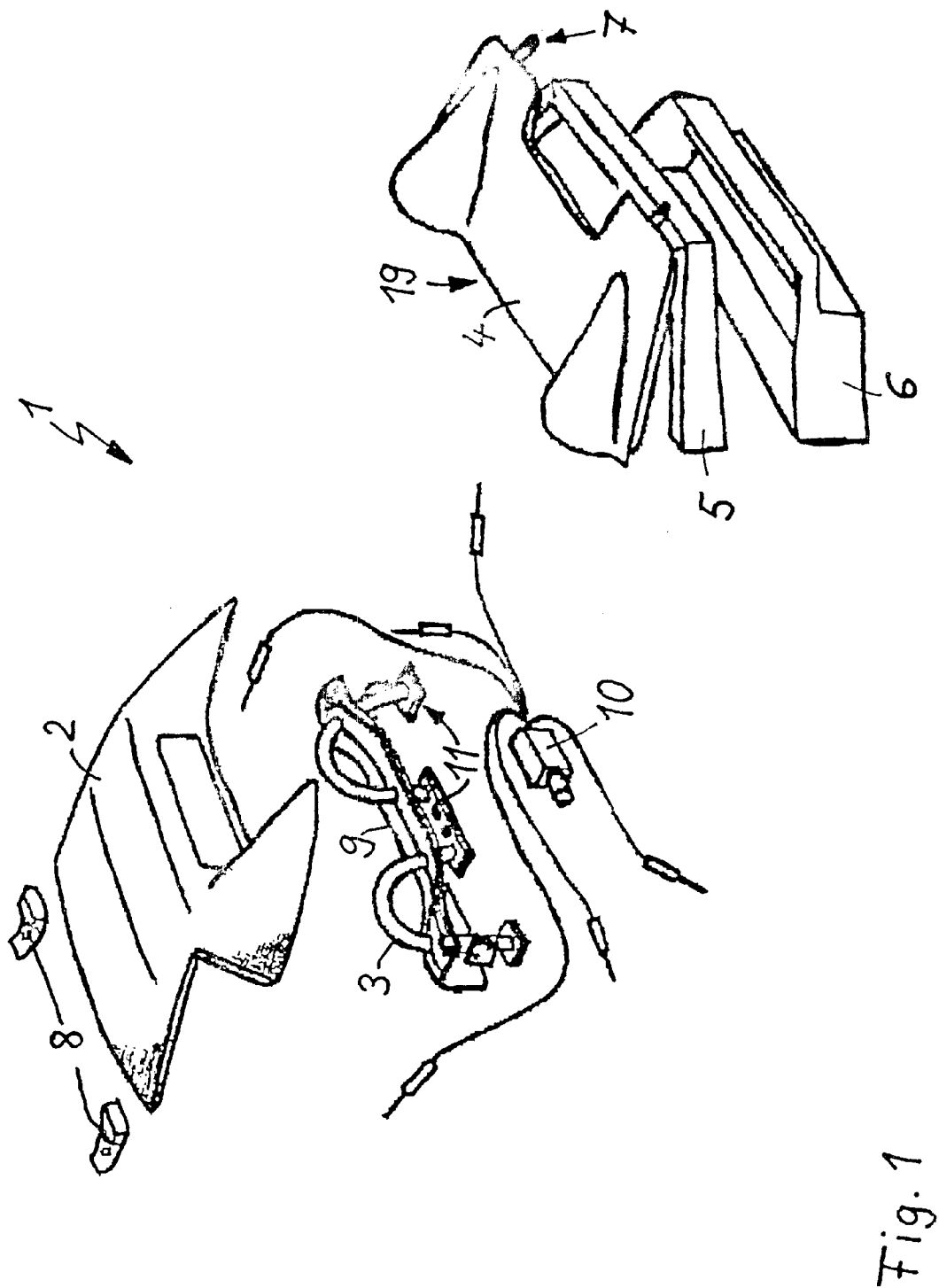
FIG. 1 is a perspective exploded view of a unit consisting of the rollover bar, the convertible top depositing device and the convertible top, including diverse additional components in accordance with the present invention.

The vehicle roof 1 illustrated in FIG. 1 can be adjusted between a closed position closing off the occupant compartment of the vehicle and an open position. The vehicle roof 1 comprises as its main components an adjustable convertible top 2, a rollover bar 3 as well as a convertible top compartment lid 4 and, in addition, diverse additional components assigned to the main components. The convertible top compartment lid 4 is held on a carrying frame 5 which is situated underneath and is arranged on a convertible top pan 6 which receives the convertible top 2 in the open position.

The convertible top 2 comprises a convertible top structure, an exterior fabric covering and a ceiling facing the occupant interior as well as a convertible top clamp 8 by way of which, in the closed position, the convertible top can be fastened on the windshield frame.

Connection points 11 are provided on the rollover bar 3 which is covered by a casing 9. The connection points 11 are the points where the rollover bar is connected with the vehicle body. In the area of the rollover bar 3, a hydraulic adjusting system for adjusting the convertible top 2 and the convertible top compartment lid 4, as well as a control unit 10, are arranged which controls the hydraulic adjusting system. Furthermore, movable flaps are arranged on the faces of the rollover bar which, in the inoperative position of the convertible top, provide a camouflage of the components situated below the projecting bar of the rollover bar 3. During the transition movement of the convertible top between the closed and the open position or between the open and the closed position, the flags are moved downward in order to permit a sufficient moving space for the kinematic adjusting system.

The convertible top 2, the rollover bar 3 and the convertible top compartment lid 4 form a cohesive, firmly connected unit which, before the installation into the vehicle, can be preassembled as an independent module and tested with respect to operability. The module advantageously comprises all components required for the opening and closing operation of the roof, particularly the kinematic systems required for adjusting the convertible top 2 and the convertible top compartment lid 4, the hydraulic adjusting system and the control unit 10. After assembly of the vehicle roof, the latter can be set up by way of the connection points 11 on a testing stand and the control unit 10 is connected with an electric system of the testing stand which simulates the electric system of the vehicle. After the testing of the operability of the vehicle roof 1, this preassembled roof can be integrated in vehicle as a cohesive module, in which case only a mechanical linking by way of the connection points 11 and an electric linking by way of the control unit 10 are required.

Water collection components for draining penetrating water can be assigned to the convertible top depositing device 6, particularly to the convertible top pan.

Figure 2:
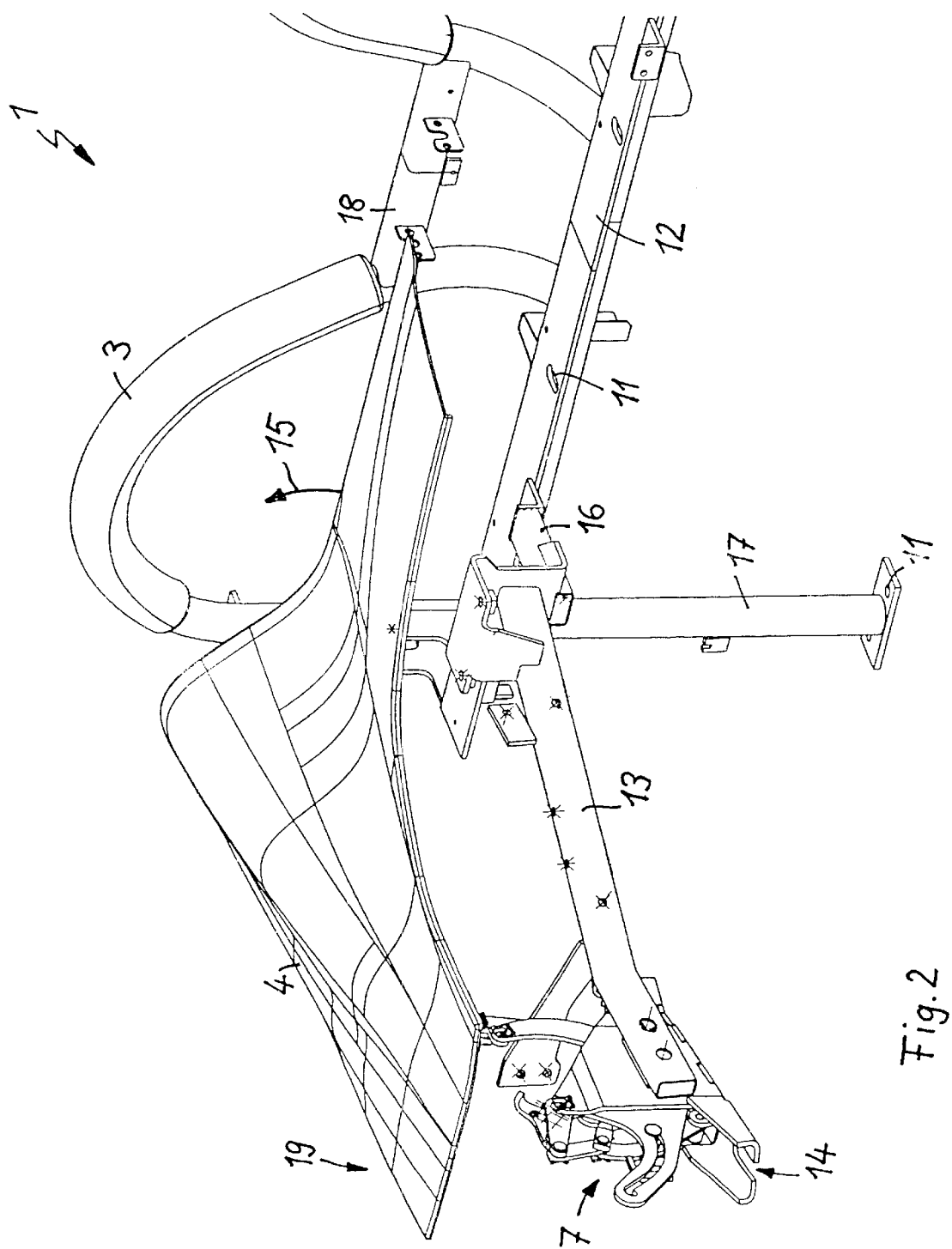
FIG. 2 is a perspective partial view of the rollover bar and of the convertible top depositing device of FIG. 1 fastened to the rollover bar.
Figure 3:
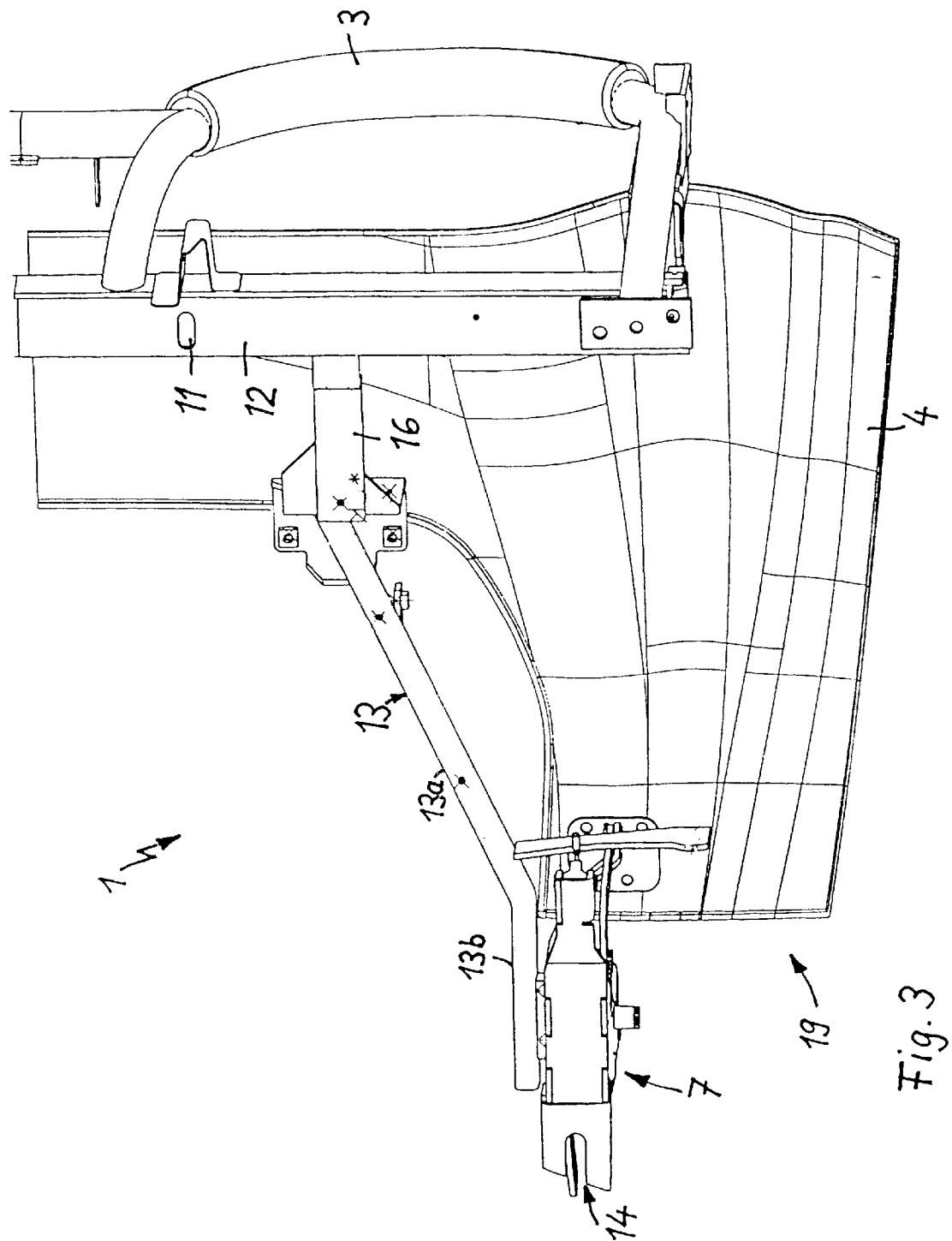
FIG. 3 is a view from underneath the rollover bar and the convertible top depositing device of FIG. 2.

The enlarged segment of the vehicle roof 1 illustrated in FIGS. 2 and 3 shows a portion of the rollover bar 3 and the convertible top compartment lid 4, including components connecting the rollover bar 3 and the convertible top compartment lid 4. A transverse frame 12 is provided on the rollover bar 3 and is the carrier of the individual bars of the rollover bar 3. Furthermore, the frame 12 receives the components assigned to the convertible top depositing device. For this purpose, supporting arms 13 are provided which are arranged laterally on the transverse frame 12, extend toward the rear and carry the adjusting kinematics 7 of the convertible top compartment lid in the area of their end facing away from the transverse frame 12.

The convertible top compartment lid 4 is connected with the adjusting kinematics 7 and is changed by the latter from the convertible cover position illustrated in FIGS. 2 and 3, about a transversely extending, rearward swivelling axis in the direction of the arrow 15 into the open position, in which the convertible top pan situated underneath is exposed and the convertible top can be deposited. In the illustrated embodiment, the side of the convertible top compartment lid 4 facing the rollover bar 3 can swivel open into the open position. This has the advantage of a space-saving arrangement because the convertible top and the convertible top compartment lid are arranged on different sides of the rollover bar and, for transferring the convertible top into the convertible top depositing device 19, the convertible top can be swivelled over the rollover bar.

The supporting arm 13 has a bent construction and a section 13 which extends diagonally with respect to the longitudinal axis of the vehicle as well as a shorter section 13*b* which extends in a straight line, the latter being the carrier of the adjusting kinematics 7 as seen best in FIG. 3. With respect to the longitudinal axis of the vehicle, the straightline section 13*b* of the supporting arm is situated further on the outside than the linking of the supporting arm 13 on a flange 16 connected with the transverse frame 12.

The linking of the vehicle roof 1 to the vehicle body takes place by the connection points 11 in the transverse frame 12 as well as on a support foot 17 which is assigned to the rollover bar 3 and is pulled downward, as well as by way of a connection point 14 which is provided in the area of the adjusting kinematics 7 of the convertible top compartment lid 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle roof, comprising a convertible top adjustable between a closed and an open position, spannable over a vehicle interior in the closed position and depositable in a convertible top depositing device in the open position, a rollover bar coupleable with the convertible top depositing device and forming a cohesive, firmly connected unit with the convertible top depositing device and the convertible top so as to be integratable as a preassembled module in a vehicle, a transverse frame operatively arranged at the rollover bar to support individual bars of the rollover bar and to receive components assigned to the convertible top depositing device, and connection points for connecting the preassembled module with the vehicle are provided in the transverse frame, wherein the convertible top depositing device comprises a convertible top pan and a convertible top compartment lid operatively associated therewith for closing the convertible top pan.

2. Vehicle roof according to claim 1, wherein supporting arms operatively connect the convertible top depositing device with the rollover bar.

3. Vehicle roof according to claim 2, wherein adjusting kinematics for the convertible top compartment lid are integrated in the preassembled module and are held at least by the supporting arms.

4. Vehicle roof according to claim 3, wherein the convertible top compartment lid is operatively connected with the rollover bar via only the adjusting kinematics.

5. Vehicle roof according to claim 3, wherein the convertible top compartment lid includes a swivelling axis arranged in an area of the adjusting kinematics and situated on a side of the supporting arms facing away from the rollover bar.

6. Vehicle roof according to claim 5, wherein the convertible top compartment lid is operatively connected with the rollover bar via only the adjusting kinematics.

7. Vehicle roof according to claim 1, wherein the convertible top comprises a convertible top structure, a fabric covering and a ceiling.

8. Vehicle roof according to claim 1, wherein a hydraulic adjusting system for adjusting the convertible top and a convertible top compartment lid is integrated in the preassembled module.

9. Vehicle roof according to claim 8, wherein a control unit for controlling the hydraulic adjusting system is operatively integrated in the preassembled module.

10. Vehicle roof according to claim 1, wherein linking of the convertible top to the preassembled module is at a distance from the rollover bar which is smaller than a swivelling axis of the convertible top compartment lid.

11. Vehicle roof according to claim 1, wherein the preassembled module is connectable with the vehicle by connection points (11) arranged on the rollover bar (3).

12. Vehicle roof according to claim 2, wherein the supporting arms have additional connection points with the vehicle.

13. A roof for a vehicle having a convertible top adjustable between a closed position and an open position, which roof spans a vehicle interior in the closed position and is deposited in a folding-top compartment in the open position, and a rollover bar which is coupled with the folding-top compartment, the rollover bar forming a cohesive, fixedly connected unit with the folding-top compartment and the folding top, which unit can be integrated in the vehicle as a preassembled module, comprising a cross frame operatively provided on the rollover bar to support individual bars of the rollover bar and to receive the folding-top compartment with connection points for connecting the module with the vehicle being provided in the cross frame and supporting arms extending rearwardly of the vehicle to laterally link the folding-top compartment to the cross frame, wherein in an area of an end thereof facing away from the cross frame, the supporting arms include adjusting kinematics for a lid of the folding-top compartment with a swivelling axis arranged on a side of the supporting arms facing away from the rollover bar, and the folding-top compartment lid is connected with the rollover bar solely via the adjusting kinematics.

14. The roof according to claim 13, wherein the convertible top comprises a convertible top structure, a fabric covering and a ceiling.

15. The roof according to claim 13, wherein a hydraulic adjusting system for adjusting the convertible top and a convertible top compartment lid is integrated in the preassembled module.

16. The roof according to claim 15, wherein a control unit for controlling the hydraulic adjusting system is operatively integrated in the preassembled module.

17. The roof according to claim 15, wherein linking of the convertible top to the preassembled module is at a distance from the rollover bar which is smaller than a swivelling axis of the convertible top compartment lid.

\* \* \* \* \*